Figure 1:
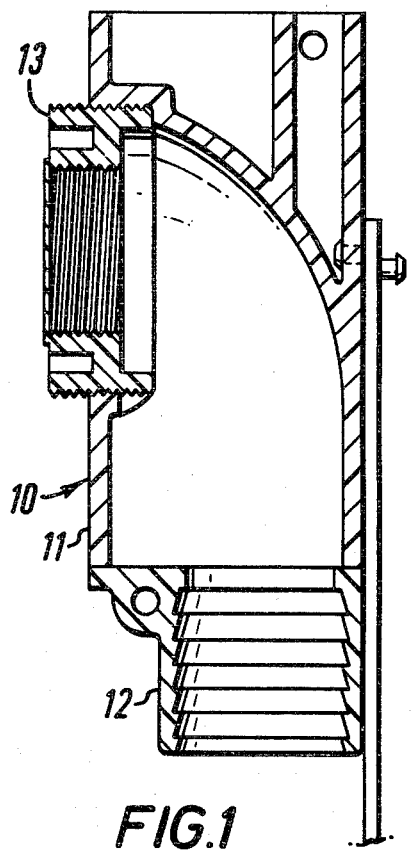

United States Patent [19]

Orberg et al.

[11] 4,307,901
[45] Dec. 29, 1981

[54] APPARATUS FOR LOCATING THEREIN A PIPE UNION

[75] Inventors: Lennart Orberg, Virsbo; Walter Englehardt, Vaesby, both of Sweden

[73] Assignee: Wirsbo Bruks Aktiebolag, Sweden

[21] Appl. No.: 54,638

[22] Filed: Jul. 3, 1979

[30] Foreign Application Priority Data

May 15, 1978 [GB] United Kingdom ............... 19669/78

[51] Int. Cl.³ .............................................. F16L 35/00
[52] U.S. Cl. ........................................... 285/3; 285/64; 285/114; 285/175; 285/179; 285/393; 285/423
[58] Field of Search .................. 285/12, 64, 177, 239, 285/114, 45, 372, 3, 127, 175, 179, 357, 393, 384, 423; 137/360

[56] References Cited

U.S. PATENT DOCUMENTS

| 821,274 | 5/1906 | Ames | 285/45 X |
|---|---|---|---|
| 1,668,949 | 5/1928 | Cullen | 285/45 X |
| 1,707,087 | 3/1929 | Little | 285/357 X |
| 1,893,033 | 1/1933 | Murdock et al. | 285/384 X |
| 2,425,817 | 8/1947 | Mosca | 285/177 X |
| 2,628,799 | 2/1953 | Aaby | 285/64 X |
| 2,773,708 | 12/1956 | Beyerle | 285/64 |
| 4,067,072 | 1/1978 | Izzi | 285/177 |

FOREIGN PATENT DOCUMENTS

| 628555 | 6/1963 | Belgium | 285/174 |
|---|---|---|---|
| 393193 | 7/1924 | Fed. Rep. of Germany | 285/45 |
| 1022063 | 1/1958 | Fed. Rep. of Germany | 285/45 |
| 697010 | 9/1953 | United Kingdom | 285/45 |
| 983621 | 2/1965 | United Kingdom | 285/45 |
| 1080326 | 8/1967 | United Kingdom | 285/45 |

Primary Examiner—Dave W. Arola
Attorney, Agent, or Firm—Ostrolenk, Faber, Gerb & Soffen

[57] ABSTRACT

Apparatus for locating therein a pipe unit comprising:
a housing having a chamber adapted to receive the union and a plurality of apertures for communicating with the union and
means adapted to be removably secured to the housing adjacent a said aperture, the said means being adapted to engage the union
so that the union is secured in the housing when the said removable means is secured to the housing.

7 Claims, 12 Drawing Figures

U.S. Patent  Dec. 29, 1981  Sheet 1 of 3  4,307,901

APPARATUS FOR LOCATING THEREIN A PIPE UNION

DESCRIPTION

This invention relates to apparatus for locating therein a pipe union.

In the installation of water circulation systems using flexible plastics tubing, or pipe work, it is necessary to locate at one end portion of a pipe a pipe union so that a tap unit may be connected to the pipe via the union. However, further support means is necessary in order to locate the union adjacent a selected surface, such as a wall.

According to the present invention, there is provided apparatus for locating therein a pipe unit comprising:
 a housing having a chamber adapted to receive the union and a plurality of apertures for communicating with the union and
 means adapted to be removably secured to the housing adjacent a said aperture, the said means being adapted to engage the union
 so that the union is secured in the housing when the said removable means is secured to the housing.

The said aperture may be provided with a screw thread and the said removable means may be provided with a first screw thread adapted to engage the screw thread of the said aperture. The housing may be provided with means for engaging a portion of the union whereby the said portion is engaged between said engagement means and the said removable means. Alternatively, the removable means may be provided with a second screw thread adapted to engage a screw thread on the union and may comprise a cylindrical member having the first screw thread on an outer circumference thereof and the second screw thread on an inner circumference thereof. Another of said apertures may be provided with engagement means for engaging an end portion of a tubular member received therein. The central longitudinal axis of the said aperture and the said another of said apertures preferably extend at right angles one to another.

Following is a description, by way of example only and with reference to the accompanying drawings, of one method of carrying the invention into effect.

Figure 2:
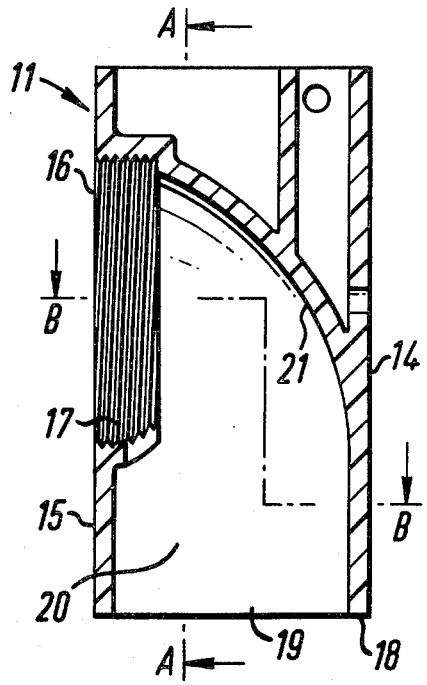
Figure 4:
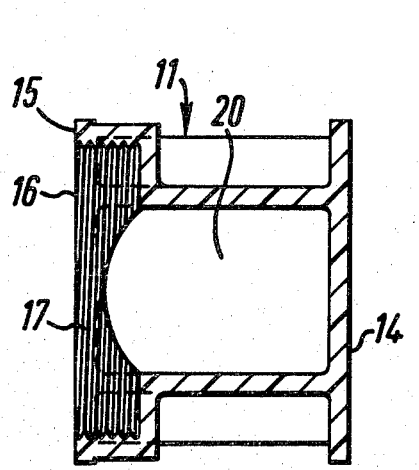
Figure 3:
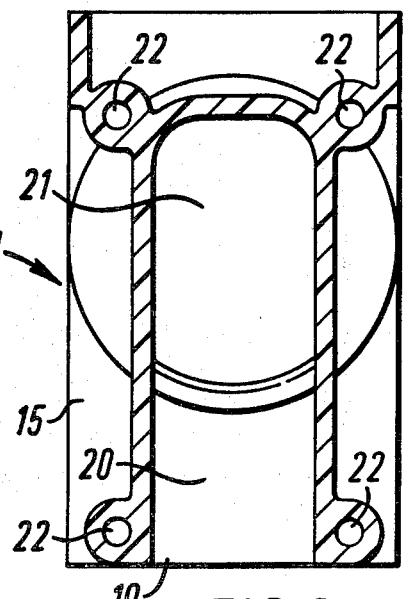
Figure 5:
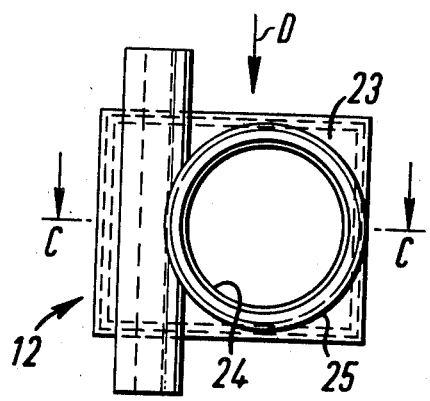
Figure 6:
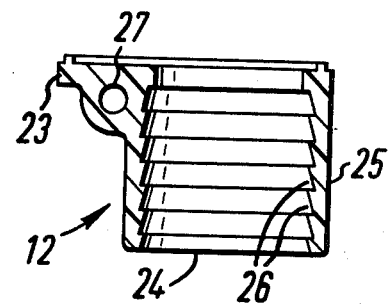
Figure 8:
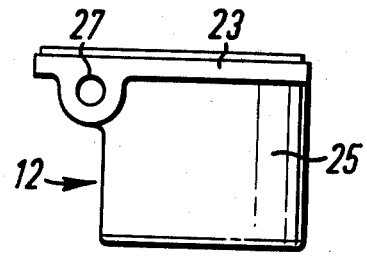
Figure 7:
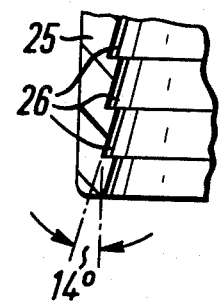
Figure 9:
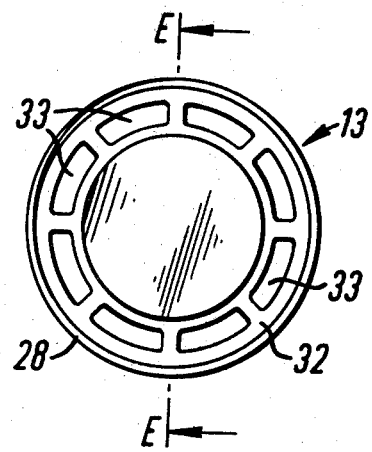
Figure 10:
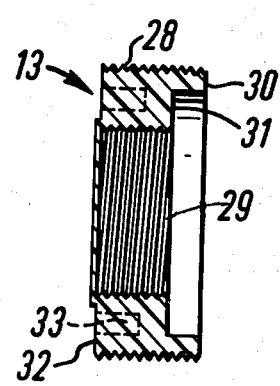
Figure 11:
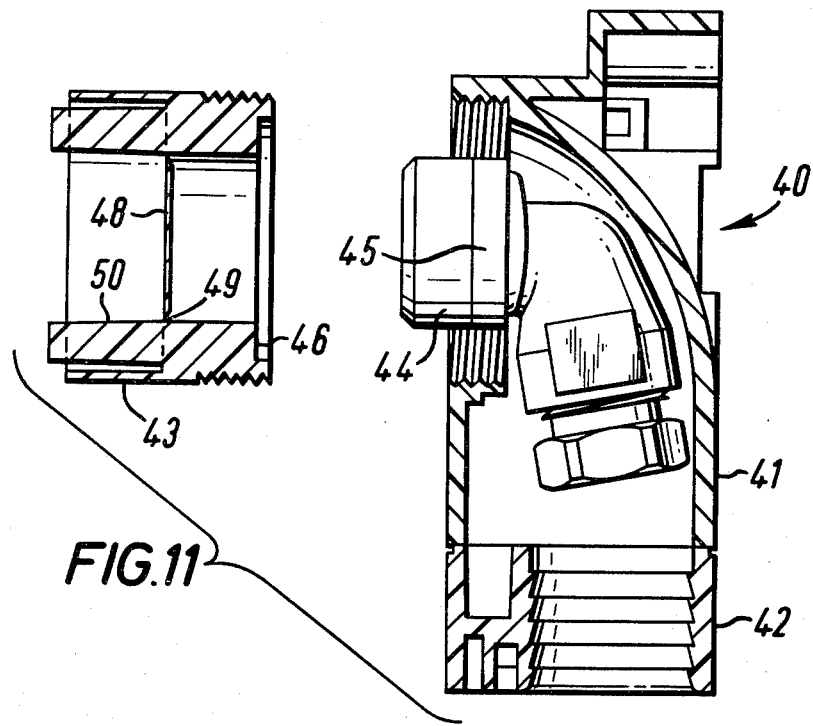
Figure 12:
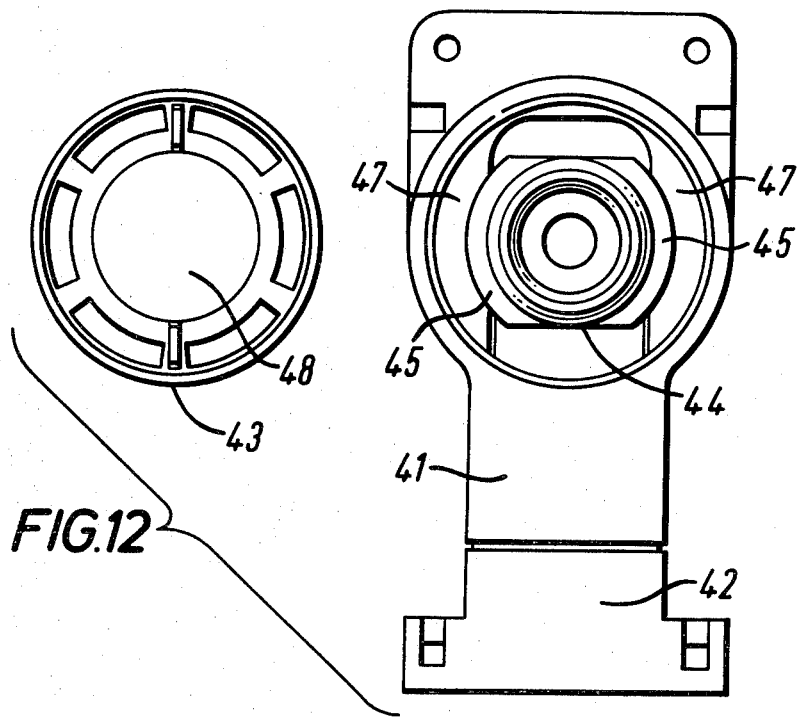

In the drawings:

FIG. 1 is a cross section of one embodiment of apparatus in accordance with the present invention, FIG. 2 is a cross section of part of a housing of the apparatus shown in FIG. 1, FIG. 3 is a cross section on the line A—A of FIG. 2, FIG. 4 is a cross section on the line B—B of FIG. 2, FIG. 5 is an elevation of another part of the housing, FIG. 6 is a cross section on the line C—C of FIG. 5, FIG. 7 is an enlarged portion of FIG. 6, FIG. 8 is an elevation in the direction of the arrow D of FIG. 5, FIG. 9 is an elevation of a cylindrical member for use with the housing, FIG. 10 is a cross section on the line E—E of FIG. 9, FIG. 11 is a cross section similar to FIG. 1 of another embodiment of apparatus in accordance with the present invention, and FIG. 12 is an elevation of the apparatus shown in FIG. 11.

Referring now to FIGS. 1 to 10 of the drawings and, in particular, to FIG. 1, there is shown apparatus 10 for locating therein a pipe union, the apparatus comprising a first housing portion 11, a second housing portion 12 and a cylindrical member 13.

In FIGS. 2 to 4, the first portion of the housing 11 is shown and comprises a substantially rectangular body of polyacetate plastics having a rear wall 14 and a front wall 15. The front wall 15 is provided with an aperture 16 having a screw thread 17 on an inner circumference thereof. The housing portion 11 is provided with an end wall 18 having an aperture 19 therein. The housing portion 11 is provided with an inner rectangular chamber 20 which is open at the opening 19 and which is provided with a curved wall 21 which extends from the opening 19 towards the aperture 16. The housing portion 11 is provided with a plurality of bores 22.

The housing portion 12 comprises a generally rectangular plate 23 having an aperture 24 therein and a cylindrical portion 25 extending outwardly therefrom, the central longitudinal axis of the cylindrical portion 25 being the same as the central longitudinal axis of aperture 24. The inner circumference of the cylindrical portion 25 is provided with a plurality of circumferentially extending axially spaced recesses 26. The rectangular portion is provided with a bore 27 extending at right angles to the longitudinal axis of the cylindrical portion 25. The housing portion 12 is made of polyacetate plastics.

The cylindrical portion 13 has on an outer circumference thereof a screw thread 28 and on an inner circumference thereof a screw thread 29. A side face 30 of the cylindrical member 13 is provided with a circular recess 31 and an opposite face 32 is provided with a plurality of recesses 33 extending in a circumferential direction of the cylindrical member 13. The cylindrical member 13 is made of polyacetate plastics. The apparatus 10 is adapted to receive a union (not shown) in the form of a right angle and having located in one end portion thereof an end of a flexible plastics tube.

The apparatus 10 is assembled by inserting the union through the opening 19 of the housing portion 11 so that the tubing secured to the union extends through the opening 19. The housing portion 12 is located so that the face of the rectangular portion 33 remote from the cylindrical portion 25 is adjacent the end wall 18 of the housing portion 11 and the tube extends through the tubular portion 25. The rectangular portion 23 then is welded to the end portion 18 of the housing portion 11. The end portion of the union remote from the tube has an external screw thread thereon which is engaged by the internal screw thread 29 of the cylindrical portion 13 while the external screw thread 28 of the cylindrical portion 13 is engaged in the internal screw thread 17 of the aperture 16 of the housing portion 11.

When the cylindrical portion 13 is screwed inwardly of the housing portion 11, the cylindrical portion 13 is simultaneously screwed onto the pipe union thereby to firmly locate the pipe union relative to the housing 11, 12.

The bores 22 are adapted to receive screws or nails (not shown) so that the housing 11, 12 may be secured to a wall made of wood, bricks or concrete.

It will be appreciated that the polyacetate plastics material is sufficient to withstand temperatures in excess of 75° C. and is sufficiently robust to withstand handling during installation. It will also be appreciated that materials other than polyacetate plastics material may be used for fabricating the apparatus according to the invention.

Referring now to FIGS. 11 and 12, there is shown apparatus 40 similar to the apparatus 10 and comprising a housing portion 41 similar to the portion 11, a housing portion 42 similar to the portion 12 and a cylindrical portion 43 similar to the portion 13.

However, the apparatus 40 is intended to be used with a union 44 having a pair of radially outwardly extending lugs 45. In consequence, the cylindrical portion 43 is provided with a recessed end wall 46 to accomodate the lugs 45 and the housing portion 41 is provided with a pair of abutment surfaces 47. The arrangement is such that the union 44 is inserted longitudinally into the housing portion 41 in a direction towards the portion 42 and the cylindrical portion 43 is screwed into the portion 41 so that the lugs 45 are engaged between the recessed end wall 46 and the abutment surfaces 47 and the union 44 is retained in the apparatus 40.

The cylindrical portion 43 is provided with a transverse blocking plate 48 having a severable circumferential bridging portion 49 connecting the plate 48 to an inner surface 50 of the cylindrical portion 43. In this manner, a union may be installed in a building and blocked until required, for example by the addition of a service pipe.

We claim:

1. An assembly comprising a housing, a liquid flow conduit pipe union for being disposed in said housing and a pipe fitting for being affixed to said housing and connected to said pipe union;

said housing being shaped for defining a chamber within it; said pipe union being placed in said chamber and being separate from said housing; apertures being defined in said housing for enabling communication from outside said housing through said apertures to said pipe union;

said pipe fitting be separably secured to said housing at a said aperture in said housing; said pipe union in said housing having an end to which said fitting is separably secured, whereby forces that are applied to said housing and to the liquid conduit attached to said pipe union do not act through said pipe union;

said pipe fitting being removeable from said housing and said pipe union without removal of said pipe union from said housing and without disassembly of said housing and said pipe union being thereby removable from said housing without disassembly of said housing.

2. The assembly of claim 1, wherein said pipe fitting is externally threaded for being screw threadedly secured to said housing at said aperture.

3. The assembly of claim 2, wherein said pipe fitting is a tap and wherein said housing and said tap are comprised of a plastic material.

4. The assembly of claim 1, wherein said apertures have respective longitudinal axes which are at right angles to one another.

5. The assembly of claim 1 and a flexible conduit located outside said housing; said union being joined to said flexible conduit via a said aperture.

6. The assembly of either of claims 1 or 2, wherein said pipe fitting is internally threaded for threadedly engaging said union in said housing and said union being externally threaded for threadedly engaging said internal thread of said pipe fitting.

7. The assembly of claim 6, wherein said pipe fitting is a tap and wherein said housing and said tap are comprised of a plastic material.

* * * * *